(12) United States Patent
Robertson et al.

(10) Patent No.: US 8,448,396 B2
(45) Date of Patent: May 28, 2013

(54) LAMINATED INSULATED TIMBER FOR BUILDING CONSTRUCTION

(75) Inventors: Rodney Reynaud Robertson, Anchorage, AK (US); Thomas Jay Warren, Woodinville, WA (US)

(73) Assignee: International Homes of Cedar, Woodinville, WA (US)

( * ) Notice: Subject to any disclaimer, the term of this patent is extended or adjusted under 35 U.S.C. 154(b) by 88 days.

(21) Appl. No.: 13/029,990

(22) Filed: Feb. 17, 2011

(65) Prior Publication Data

US 2011/0203193 A1    Aug. 25, 2011

Related U.S. Application Data

(60) Provisional application No. 61/306,226, filed on Feb. 19, 2010.

(51) Int. Cl.
*E04B 1/00* (2006.01)
(52) U.S. Cl.
USPC .............. 52/286; 52/592.6; 52/605; 52/794.1
(58) Field of Classification Search
USPC ................ 52/233, 284, 286, 592.6, 596, 604, 52/605, 794.1, 293.3
See application file for complete search history.

(56) References Cited

U.S. PATENT DOCUMENTS

| | | | | |
|---|---|---|---|---|
| 861,348 | A | * | 7/1907 | Baltz ............................. 52/589.1 |
| 2,112,229 | A | * | 3/1938 | Davis .............................. 52/101 |
| 3,742,665 | A | * | 7/1973 | Henry et al. .................... 52/284 |
| 4,503,648 | A | * | 3/1985 | Mahaffey ..................... 52/223.7 |
| 4,614,071 | A | * | 9/1986 | Sams et al. ................. 52/309.12 |
| 5,115,609 | A | * | 5/1992 | Sing ............................. 52/309.9 |
| 5,163,259 | A | * | 11/1992 | Hunsaker et al. ............... 52/233 |
| 6,412,245 | B1 | * | 7/2002 | Lane et al. .................... 52/586.1 |
| 6,508,038 | B2 | * | 1/2003 | Al-Ghitta ........................ 52/505 |
| 7,507,456 | B2 | * | 3/2009 | Sing ................................ 428/55 |
| 2009/0205277 | A1 | * | 8/2009 | Gibson ........................ 52/309.9 |

* cited by examiner

*Primary Examiner* — Brian Glessner
*Assistant Examiner* — Adriana Figueroa
(74) *Attorney, Agent, or Firm* — Kenneth Altshuler (57) ABSTRACT

A laminated insulated timber is described possessing a laminate essentially composed of plurality of side planks, a top plank and a bottom plank that box in an insulation member. The planks are offset relative to one another to form a tongue and groove arrangement. In this manner, other like laminated insulated timbers join together along the tongue and groove arrangements to interlock and stack, thus forming a structural wall of laminated insulated timbers.

22 Claims, 11 Drawing Sheets

*PRIOR ART*

FIG. 1A

*PRIOR ART*

FIG. 1B

*PRIOR ART*

LAMINATED INSULATED TIMBER FOR BUILDING CONSTRUCTION

CROSS-REFERENCE TO RELATED APPLICATIONS

This application is a non-provisional application of provisional U.S. Ser. No. 61/306,226, entitled LAMINATED INSULATED TIMBER FOR BUILDING CONSTRUCTION, filed Feb. 19, 2010, as to which this application claims benefit of priority and the subject matter of which is incorporated herein by reference.

BACKGROUND OF THE INVENTION

1. Field of the Invention

The present invention relates generally to improving the strength, fire resistance, thermal performance, and code compliance of composite timber used in the construction of buildings.

2. Description of Related Art

Figure 1A:
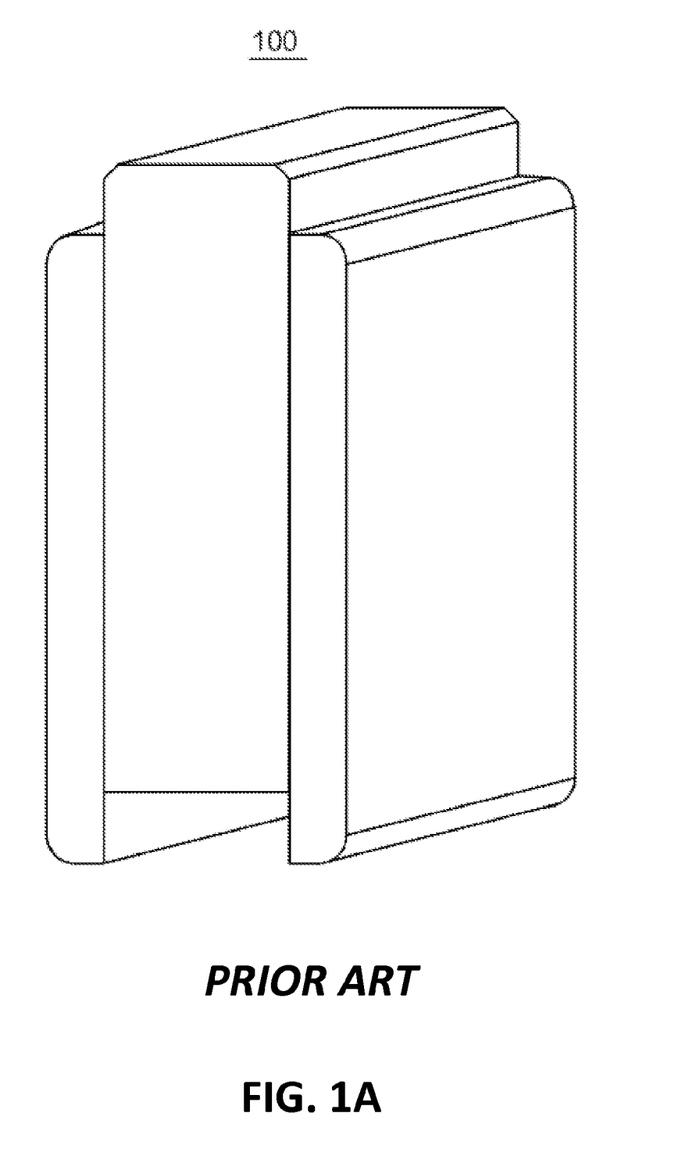
FIG. 1A is a cross-sectional perspective drawing of a prior art laminated timber.
Figure 1B:
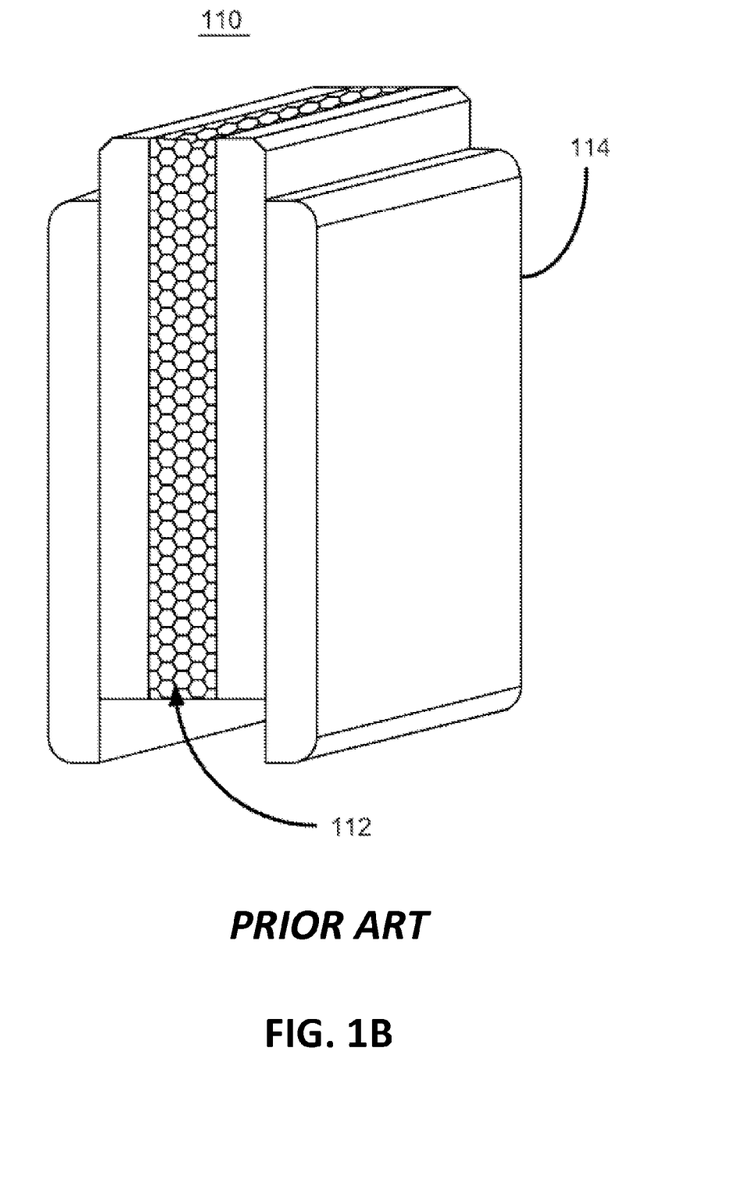
FIG. 1B is a cross-sectional perspective drawing of a prior art insulated laminated timber.
Figure 1C:
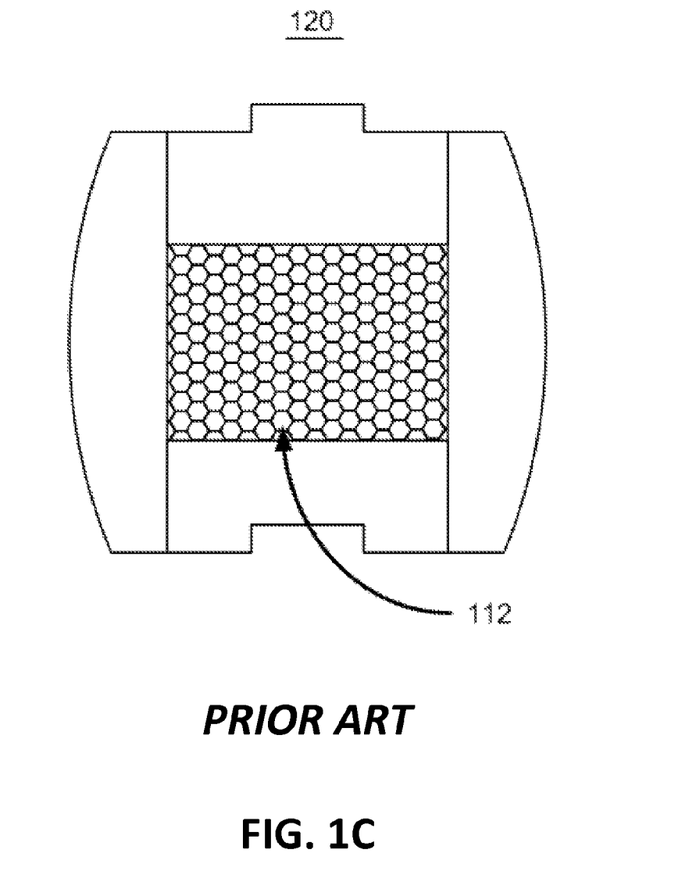
FIG. 1C is a cross-sectional drawing of a prior art insulated box beam.

Laminated timbers for wall systems were introduced in the mid 1960's to improve the use of forest products and increase strength and stability of timbers used in wall systems. FIG. 1A is an illustration of wall system timber laminates 100. In the late 1970's, a central foam core timber 110, which incorporated foam insulation 112 between side planks 114, was introduced to improve the thermal performance of laminated timbers as shown in FIG. 1B. These foam cored timbers 110 improved R-values, but sacrificed strength and fire resistance compared to all wood timbers. Central foam core timbers 110 also increased manufacturing cost, complexity, and production time. In the late 1990's, insulated cold-pressed timbers 120 incorporating polystyrene or polyurethane insulation 112 in the center of a box beam was introduced, as schematically shown in FIG. 1C. The insulated cold-pressed timbers 120, however, provided only marginally improved strength over the central foam core timbers 110 and failed to decrease complexity or improve manufacturing time and cost over the foam core timbers 110.

In an effort to improve manufacturing cost and time by reducing the complexity of manufacturing, and to improve thermal performance, strength, fire resistance, and code compliance, a new laminated insulated timber and manufacturing method are disclosed herein. It is to innovations related to this subject matter that the claimed invention is generally directed.

SUMMARY OF THE INVENTION

The present invention relates generally to a laminated insulated timber for building construction, which overcomes the disadvantages and limitations of the present state of the art through an advantageous arrangement of timber laminations and insulation. The present invention also relates to methods of fabrication and utilization of such a timber as well as to building and employing such a timber.

One embodiment of the present invention can therefore comprise a laminated insulated timber residing in an X, Y, and Z direction wherein the X direction defines width, the Y direction defines height and the Z direction defines length, the laminate insulated timber comprising: a plurality of side planks extending in the Z direction fixedly laminated together and offset relative to one another so as to form a tongue and groove arrangement; an insulation member interposed between two of the plurality of side planks wherein the insulation member is composed of a different material than the planks; a top plank and a bottom plank sandwiching the insulation member such that the insulation member is essentially surrounded on four sides by the side planks and the top plank and the bottom plank in the X and the Y directions; at least a first and second of the side planks extend beyond the top plank in the Y direction and are recessed from the bottom plank in the Y direction; and at least a third and fourth of the side planks are recessed below the top plank in the Y direction and extend beyond the bottom plank in the Y direction.

DETAILED DESCRIPTION

Figure 2:
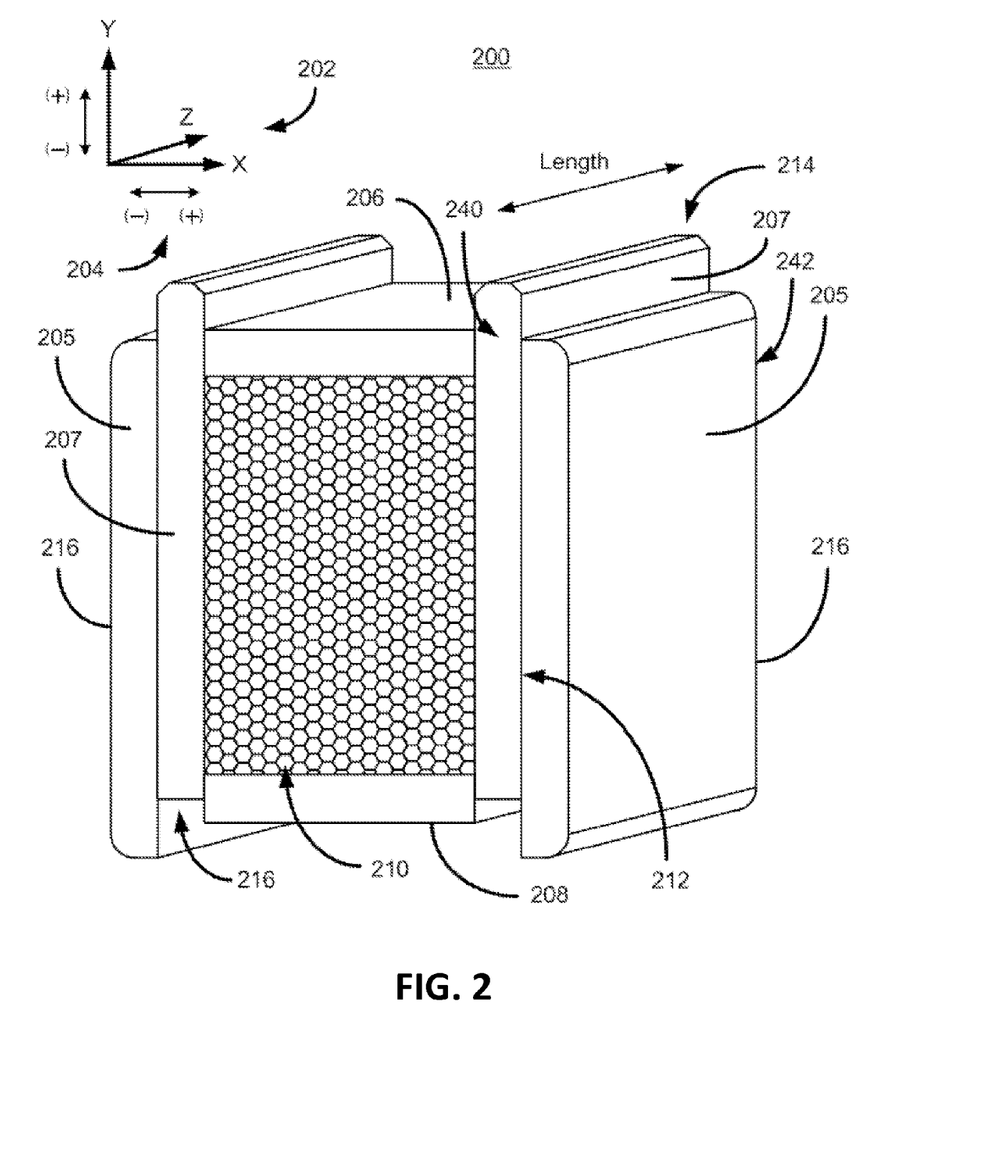
FIG. 2 is a cross-sectional perspective drawing of a laminated insulated timber consistent with certain embodiments of the invention.

Referring to the drawings in general, and more specifically to FIG. 2, shown therein is an illustration of an embodiment comprising a laminated insulated timber 200 consistent with at least one embodiment of the present invention. As illustratively shown, the laminated insulated timber 200 extends in an X direction, a Y direction and a Z direction shown by the coordinate system arrows 202 having positive (+) and negative (−) directions 204. Herein, the X direction will refer to along the X path in either the positive or negative direction, the Y direction will refer to along the Y path in either the positive or negative direction, and Z direction will refer to along the Z path in either the positive or negative direction. For illustrative purposes, the laminated insulated timber 200 extends in length in the Z direction, the X direction defines the width of the laminated insulated timber 200, and the Y direction defines the height of the laminated insulated timber 200. The timber 200 includes a plurality of side planks 205 and 207, a top plank 206, and a bottom plank 208 that extend in the Z direction. In some embodiments, the outer side planks 205 are essentially dimensionally identical, that is, in length, width and height (not including edge rounding, for example). As illustratively shown, an insulation member 210 is interposed between two of the side center planks 207, the top plank 206, and the bottom plank 208. The insulation member 210 is composed of a different material than the side planks 205 and 207, top plank 206 and bottom plank 208. Some embodiments contemplate the side planks 205 and 207, top plank 206 and bottom plank 208 being composed of wood, such as cedar, while the insulation member 210 is fashioned of a polymer based foam, such as polystyrene, polyisocyanurate, or polyurethane, for example. In some embodiments, the dimensions of the planks 205, 206, 207 and 208 may be influenced by industry standard rigid foam dimensions. In optional embodiments, the insulation member 210 is formed from expanding foam that becomes rigid upon curing wherein the expanding foam cures after the planks 205, 206, 207 and 208 are fixedly laminated together. Some embodiments of the present invention contemplate using insulation members 210 that do not require an adhesive bond to the planks 205, 206, 207 and 208.

With continued reference to the laminated insulated timber 200, the top plank 206 and bottom plank 208 are sandwiched between two of the side center planks 207, as shown. Two of the side center planks 207 extend upwardly beyond the top plank 206 and are recessed from the bottom plank 208 outer surface (i.e., the surface opposite that which is exposed to the insulation member 210) in the Y direction. Also, two outer side planks 205 are recessed below the center planks 207 and extend beyond the bottom plank 208 in the Y direction. The widths of the side planks 205 and 207 essentially define the tongues 214 and grooves 216 as shown. In some embodiments, though, the tongues 214 and grooves 216 are essentially defined by the side planks 205 and 207, machining or shaping to final dimensions of the laminated insulated timber 200 (after the lamination process) can be done to even out inconsistencies and/or shape the timber 200 to final dimensions that better form the interlocking geometry of the tongues 214 and grooves 216. More specifically, the grooves 216 can be widened and/or the tongues 214 reduced to create a better interlocking fit with a like timber 300, of FIG. 3. Optionally, the widths of the side planks 205 and 207 are unaltered after laminating the laminated insulated timber 200 together. In this optional embodiment, at least some of the planks 205, 206, 207 and 208 can be altered prior to laminating the laminated insulated timber 200 in order to reduce the width of the tongues 214 or increase the width of the grooves 216 (in the X direction) for improving fitting into a like timber 300 (as will be discussed in more detail in conjunction with FIG. 3).

Some embodiments contemplate that the side planks 205 and 207 may be essentially comprised of multiple outer laminations of structural members, such as wooden planks or laminates. The central core of insulation member 210, such as a foamed polymer, sandwiched between the top plank 206 and the bottom plank 208 along with the two outer side planks 205, which essentially encase the insulation member 210 on four sides, preferably provides sufficient structural rigidity for stacking multiple laminate insulated timbers. Such a configuration provides an additional benefit of exceeding fire resistant codes established for commercial and residential applications.

Some embodiments of the laminated insulated timber 200 contemplate a finished material on the outer side planks 205. More specifically, the outer side planks 205 may be of a higher quality and/or more decorative material than the other planks 207, 206 and 210. For example, the outer side planks 205 may be from a higher grade, "clear" cedar that has few or no knots, whereas the other planks 207, 206 and 210 may be from a lower quality cedar, with numerous knots, or other wood or material. Optionally, the outer side planks 205 may be of a more aesthetic material than the other planks 206, 207 and 208 that may be inferior in strength or some other characteristic, for example. In yet another embodiment, the outer side planks 205 may be composed of a different wood species that the other planks 207, 206 and 208. In another optional embodiment, the outer side planks 205 may also be composed of a single piece of solid wood. Optionally, the outer side planks 205 may also be composed of plywood, particle board, or some other multiple wood pieces laminated together to provide increased mechanical strength, fire resistance, and resistance to water vapor transmission. In yet another optional embodiment, the outer side planks 205 may possess an outer laminated surface or veneer 216 that provides a desired aesthetic look or added protection from external environmental exposure, fire, etc.

Some embodiments of the laminated insulated timber 200 contemplate laminating the planks 205, 206, 207 and 210 and insulation member 210 (when the insulation member 210 is rigid prior to constructing the laminated insulated timber 200) fixedly held together with adhesive (glue) at each plank interface 212. Preferably, the adhesive is compatible for bonding with the planks 205, 206, 207 and 210 and the insulation member 210, which, for example, may be cured to full strength at ambient temperature (cold-press) or may be cured through acceleration by using a radio-frequency machine (RF press). The lamination adhesive may be applied using manual methods or, optionally, through the use of a machine that essentially applies the adhesive to the interfaces 212 as the planks 205, 206, 207 and 208 are passed through the machine on a conveyor system, understood by those skilled in the art. The presence of an adhesive bond between the insulating material and the adjacent planks 206, 207 and 208, in some embodiments, is not necessary to achieve the desired strength of the laminated insulated timber 200. In one embodiment, during the lamination process of the laminated insulated timber 200, the planks 205, 206, 207 and 208 with the applied adhesive are held under clamping pressure until the adhesive bond is achieved. Pressure applied to facilitate lamination may be generated through mechanical, hydraulic or pneumatic devices, for example.

In some embodiments, the lamination process may be accomplished by feeding each plank 205, 206, 207 and 208 through a glue extrusion machine by a power roller, understood by those skilled in the art. Each plank 205, 206, 207 and 208 is then manually placed on top of the previous plank 205, 206, 207 and 208, in a stack, with a rough offset corresponding to the tongue and groove offset. This stack is then pushed into a lamination press (not shown, but understood by those skilled in the art), which operates under a programmable logic controller that may comprise a dedicated, fixed-purpose computer that operates the press in a programmable order.

In some embodiments, offset locking joint geometry of the tongue 214 and groove 216 system, is formed by positioning the independent structural side planks 205 and 207 via a suitable mechanical indexing device, such as shaped plates (indexing plates), prior to fixedly adhering the independent structural side planks 205 and 207 together to ultimately form the laminated insulated timber 200. Indexing plates (not shown) offset the planks 205, 206, 207 and 208 to form the tongues 214 and grooves 216 along a path in the Y direction and the press squeezes the planks 205, 206, 207 and 208 together along a path in the X direction. In some configurations, laminated insulated timber 200 is rotated 90° about the timber's length (e.g., the length of the laminated insulated timber 200 remains in the Z direction) whereby the indexing plates offset the planks 205, 206, 207 and 208 to form the tongues 214 and grooves 216 along a path in the X direction and the press squeezes the planks 205, 206, 207 and 208 together along a path in the Y direction. The finished laminated insulated timber 200, upon final construction, is preferably about 6¼ to 7¼ inches in width, more preferably about 6 and ½ inches in width, and even more preferably about 6 and 5/16 inches in width. The finished laminated insulated timber 200, upon final construction, is preferably about 6 to 9 inches in height excluding the tongues 214, and more preferably about 7 inches in height excluding the tongues 214. The laminated insulated timber 200 preferably extends about 12 to 22 feet in length, and more preferably about 16 feet in length. Once constructed, the laminated insulated timber 200 may be cut to length as desired.

Optional embodiments contemplate constructing the laminated insulated timber 200 in the method described above but without the insulation member 210, resulting in a hollow cavity in the center of the timber 200. After the lamination process, the cavity is then filled with a suitable insulating material, such as a foaming liquid polymer, blown-in fiberglass, saw dust, or some other type of insulating material.

The spirit and scope of the various embodiments described in conjunction with FIG. 2 are considered employable in the different timber embodiments described in conjunction FIGS. 3-7.

Figure 3:
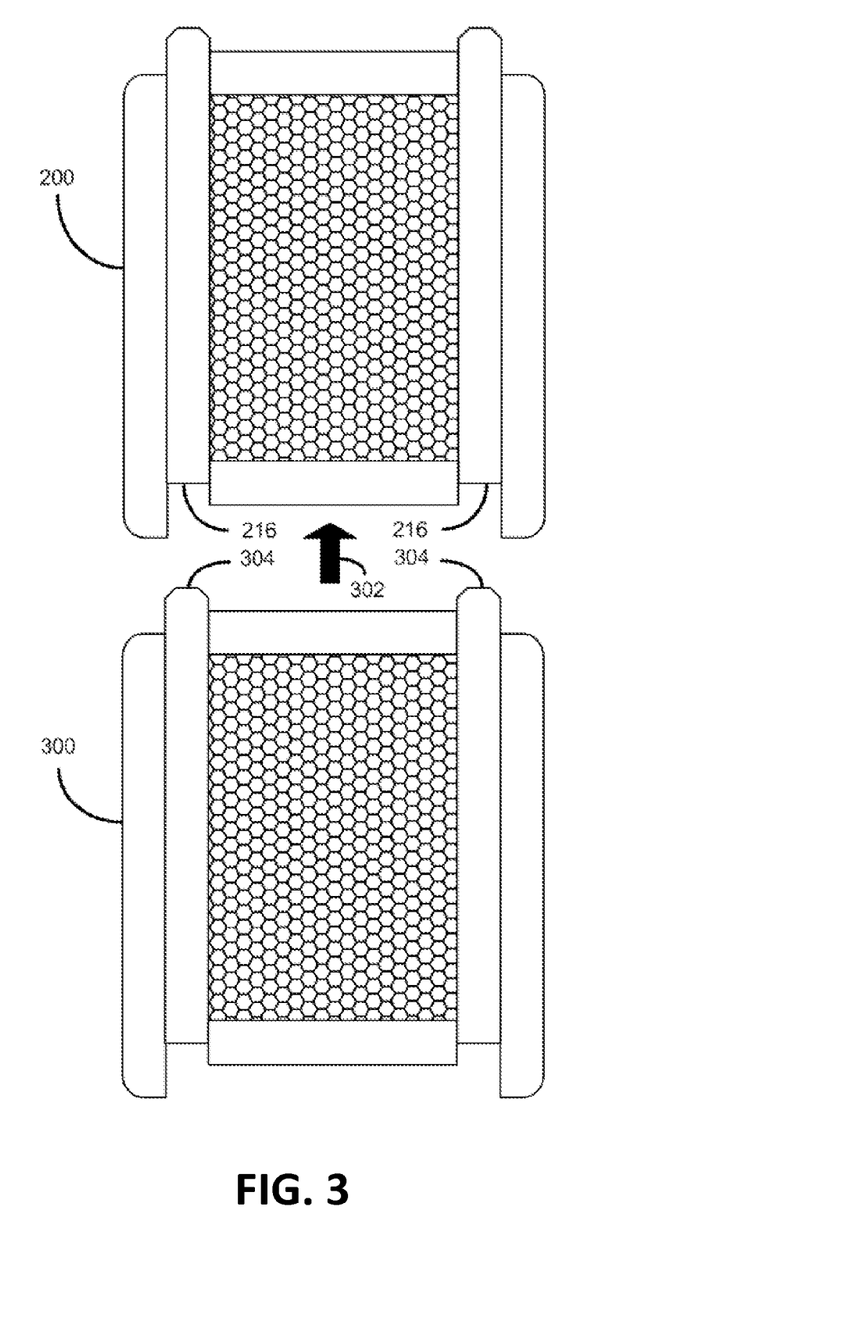
FIG. 3 is a cross-sectional illustration of two laminated insulated timbers forming a cooperating relationship consistent with certain embodiments of the invention.

FIG. 3 illustratively shows the laminated insulated timber 200 of FIG. 2 forming a cooperating relationship with a like timber 300. The arrow 302 indicates the laminated insulated timber 200 coming together to interlock with the like timber 300. More specifically, the tongues 304 of the like timber 300 cooperatively fit into the grooves 216 of the laminated insulated timber 200 to couple the two timbers 200 and 300 in an interlocking cooperating relationship. The two timbers 200 and 300 can optionally be fixedly attached at the their respective ends 240 and 242, shown in FIG. 2, by brackets, end caps, one or more planks extending in the Y direction along at least one of the ends 240 and 242 with screws or nails constraining the two timbers 200 and 300, just for example.

Figure 4:
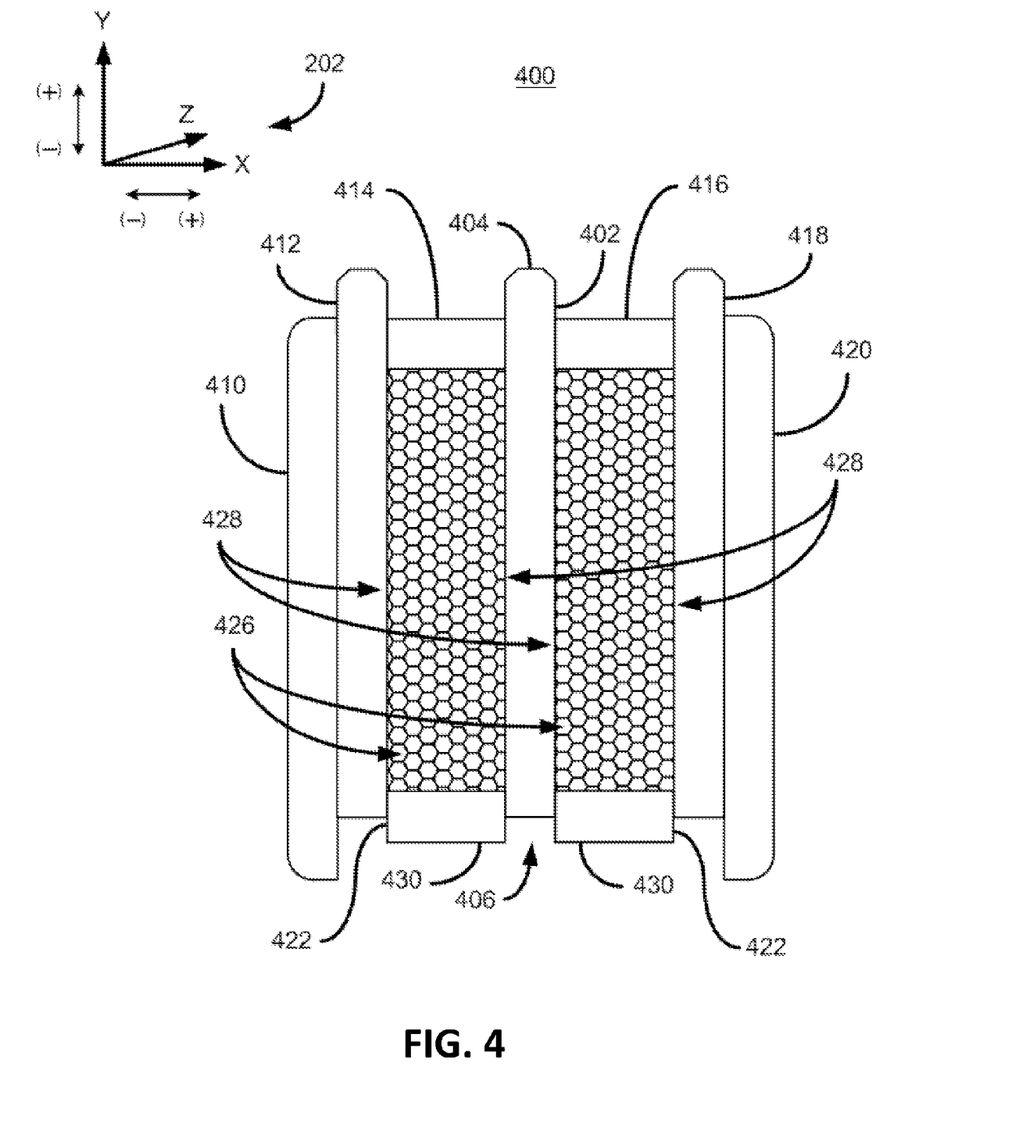
FIG. 4 is a cross-sectional illustration of an alternative embodiment of a laminated insulated timber consistent with certain embodiments of the invention.

FIG. 4 illustrates optional embodiments of a laminated insulated timber 400 consistent with embodiments of the present invention. The laminated insulated timber 400 of FIG. 4 is similar to the laminated insulated timber 200 of FIG. 2, but with an additional tongue 404 and groove 406 created by a center plank 402 that is located in a position that would essentially bisect where the top plank 206 and bottom plank 208 are located from FIG. 2. More specifically, the laminated insulated timber 400 resides in the coordinates defined by an X direction, a Y direction, and a Z direction, shown by the coordinate system arrows 202 having positive (+) and negative (−) directions 204. The X direction defines timber width, the Y direction defines timber height, and the Z direction defines timber length. In the illustrative embodiment, the laminated insulated timber 400 is essentially comprised of two top planks 414 and 416, two bottom planks 422 and 424, two insulation members 426, and five side planks 404, 410, 412, 418 and 420. The side planks include a first outer side plank 410, a second outer side plank 420, a third inner side plank 404 (which resides essentially in the center of the timber 400), a fourth inner side plank 412, and a fifth inner side plank 418. The five side planks 404, 410, 412, 418 and 420 are dimensionally defined by their respective widths extending in the X direction, their respective heights extending in the Y direction, and their respective lengths extending in the Z direction. In greater detail to the respective dimensions of the five side planks 404, 410, 412, 418 and 420, each side plank length is greater than each side plank height, and each side plank height is greater than each side plank width, as illustratively shown. The insulating members 426 are composed of a material that has a greater thermal insulation coefficient (R-value) than the planks 410, 412, 418, 420, 414, 416, 422 and 424. The insulation members 426 are essentially surrounded by the three inner side planks 412, 404 and 418 and by the top planks 414 and 416 and the bottom planks 422 and 424. The top planks 414 and 416 and the bottom planks 422 and 424 are sandwiched between the inner side planks 404, 412 and 418 and abut against the contacting sides 428 of said inner side planks 404, 412 and 418, as shown.

The laminated insulated timber 400 provides a tongue and groove arrangement constructed by offsetting the side planks 404, 410, 412, 418 and 420, the top planks 414 and 416, and the bottom planks 422 and 424 relative to one another. More specifically, the outer side planks 410 and 420, the top planks 414 and 416, and the bottom planks 422 and 424 are offset towards the negative Y direction relative to the inner side planks 404, 412 and 418, which are offset towards the positive Y direction. In other words, at the bottom of the timber 400 (defined near the bottom planks 422 and 424), the outer side planks 410 and 420 extend below the inner side planks 404, 412 and 418 in the negative Y direction, but at the top of the timber 400 (defined near the top planks 414 and 416), the outer side planks 410 and 420 are recessed below the inner side planks 404, 412 and 418 in the negative Y direction. The inner side planks 404, 412 and 418 extend above the top planks 414 and 416, but the inner side planks 404, 412 and 418 are recessed relative to the bottom surface 430 of the bottom planks 422 and 424 in the Y direction. In this arrangement, the laminated insulated timber 400 provides three tongues 402 extending in the positive Y direction and three grooves 406 in the negative Y direction.

Figure 5:
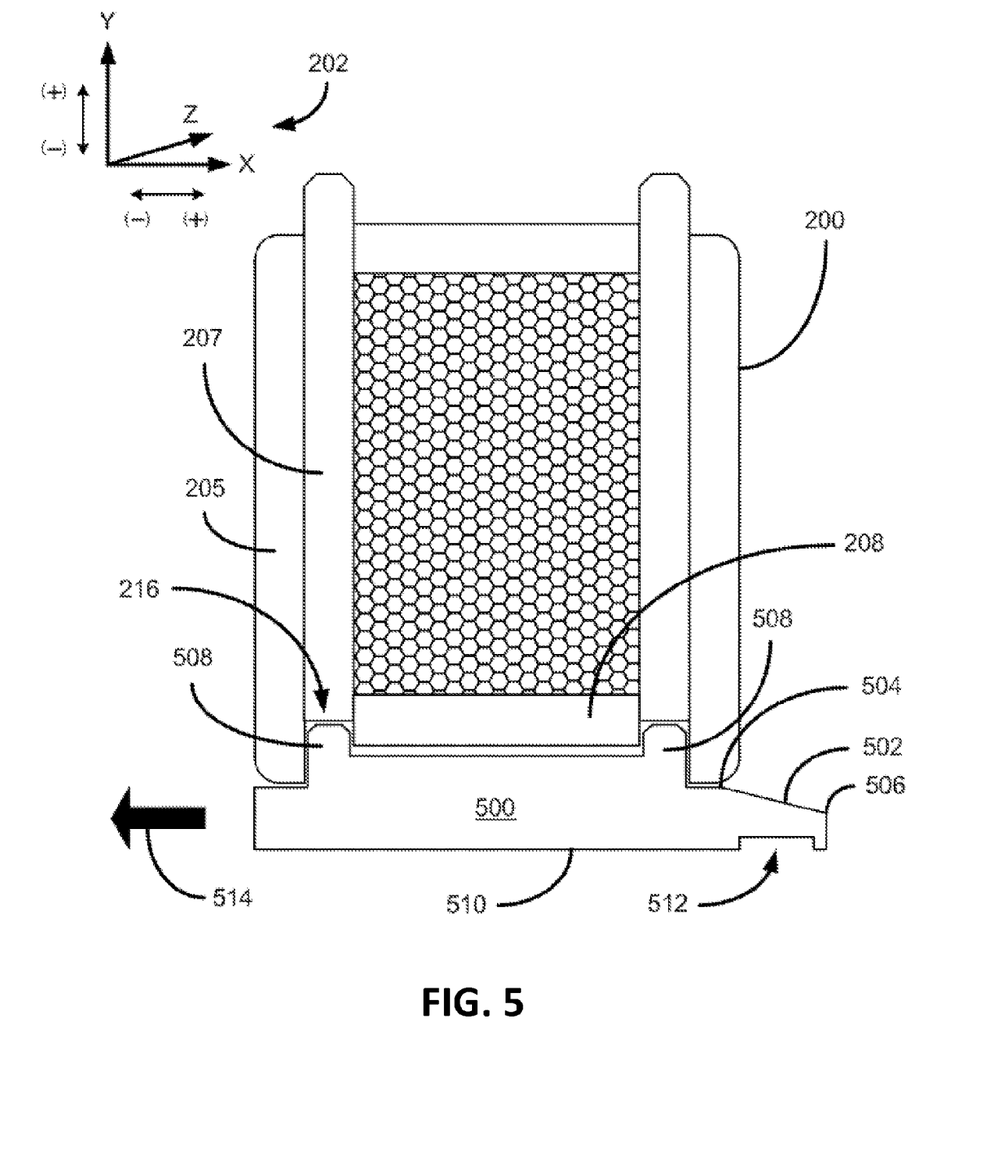
FIG. 5 is a cross-sectional illustration of an indexed base plate consistent with certain embodiments of the invention.

FIG. 5 contemplates embodiments of a base indexed plate 500 used in cooperation with the laminated insulated timber 200 consistent with embodiments of the present invention. As illustratively shown, the base indexed plate 500 is disposed below the lowest timber 200 in a timber stack (see FIG. 3) in a cooperating interlocking relationship (i.e., the base indexed plate 500 provides raised interlocking structures 508 (i.e., tongues) on the base index plate's top surface to provide a stable self-aligning connection to mating groove structures 216, in the timber 200). More specifically, protruding tongues 508 of the base indexed plate 500 conform to the recessed grooves 216 created by the offset center planks 207, side planks 205 and bottom plank 208 of the laminated insulated timber 200. The base indexed plate 500 further includes an integral drip edge 502 that is sloped in the negative Y direction from essentially the ledge 504 where the laminated insulated timber 200 is rests, or is set, to the distal end 506 of the integral drip edge 502. The integral drip edge 502 is adapted to shed water from a foundation or floor structure (not shown) on which the base indexed plate 500 is intended to be attached. Preferably, the integral drip edge 502 extends about 0.75 to 1.5 inches from the ledge 504 where the laminated insulated timber 200 is set and more preferably the integral drip edge 502 extends about 1 inch from the ledge 504 where the laminated insulated timber 200 is set, however in optional embodiments the integral drip edge 502 can extend in other lengths from the ledge 504 where the laminated insulated timber 200 is set without departing from the scope and spirit of the present invention. The bottom 510 of the base indexed plate 500 is essentially flat and extends in the X direction in width and the Z direction in length. The base indexed plate 500 possesses a recessed groove 512 (i.e., relieved area) along the length thereat in the Z direction that is essentially below the integral drip edge 502, which is provided to accept sheathing (not shown) that seals against the floor structure to prevent water from infiltrating past the timber stack shown here by the arrow 514.

Figure 6:
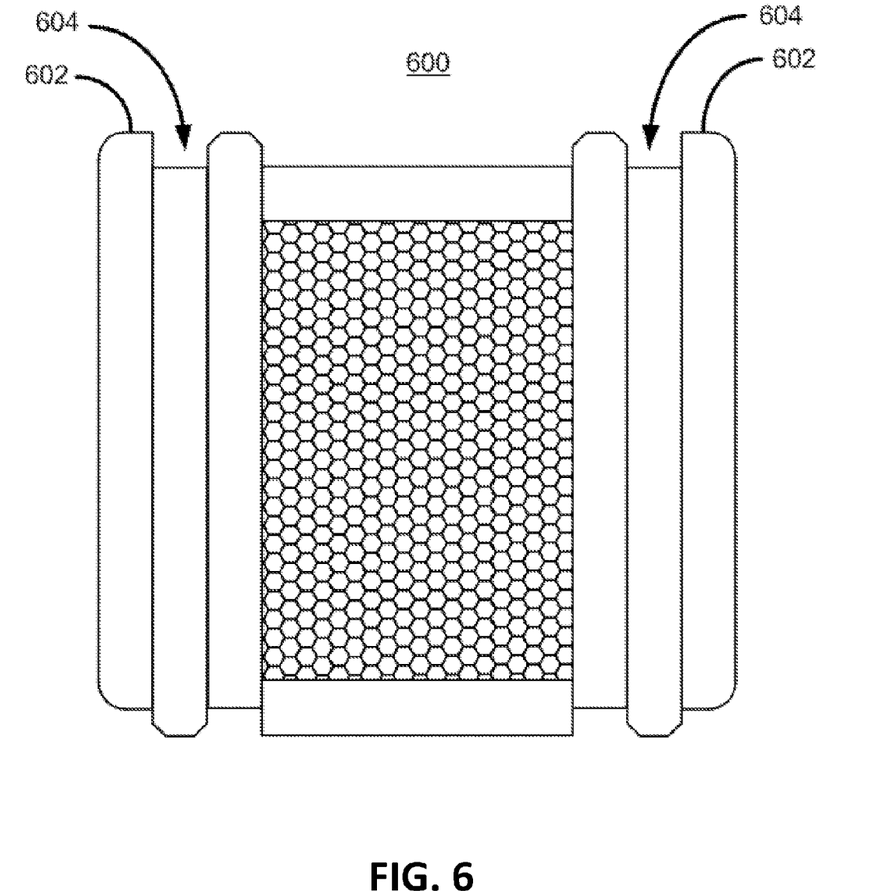
FIG. 6 is a cross-sectional illustration of an alternative embodiment of a laminated insulated timber consistent with certain embodiments of the invention.

FIG. 6 contemplates optional embodiments of a laminated insulated timber 600 consistent with certain embodiments of the present invention. The laminated insulated timber 600 is similar to the laminated insulated timber 200 of FIG. 2 and its associated embodiments, but with two additional side planks 602, thus forming additional grooved structures 604.

Figure 7:
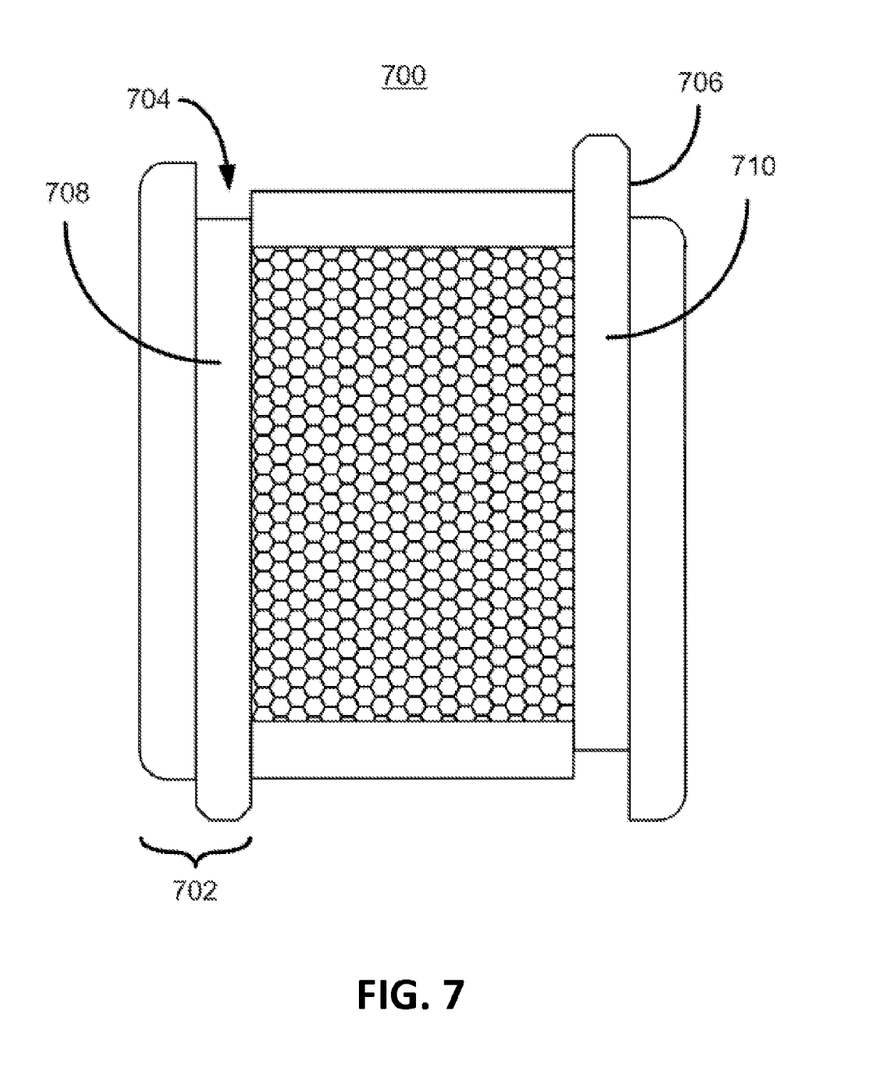
FIG. 7 is a cross-sectional illustration of an alternative embodiment of a laminated insulated timber consistent with certain embodiments of the invention.

FIG. 7 contemplates optional embodiments of a laminated insulated timber 700 consistent with embodiments of the present invention. The laminated insulated timber 700 is similar to the laminated insulated timber 200 of FIG. 2 and its associated embodiments, but with the left-hand side planks 702 staggered so that the inner side plank 708 provides a groove 704 at the top surface on the left-hand side of the laminated insulated timber 700 while the inner side plank 710 on the right-hand side provides a tongue 706.

Figure 8A:
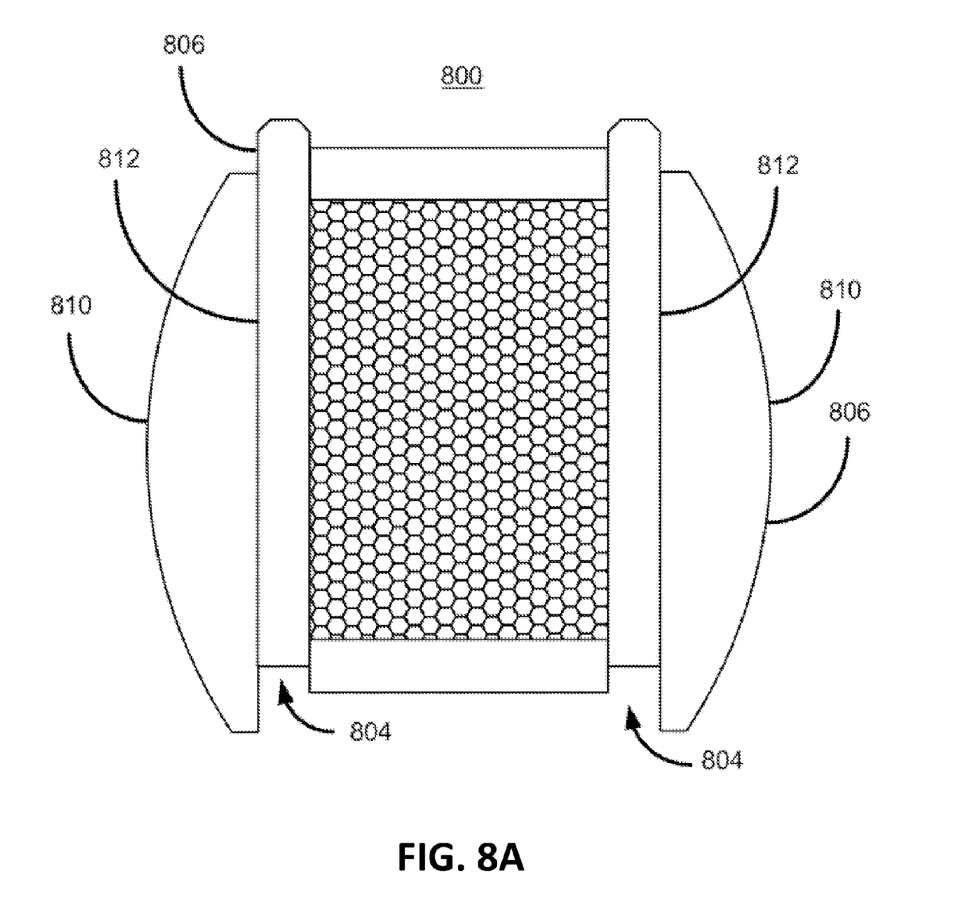
FIG. 8A is a cross-sectional illustration of an alternative embodiment of a laminated insulated timber consistent with certain embodiments of the invention.

FIG. 8A contemplates optional embodiments of a laminated insulated timber 800 consistent with embodiments of the present invention. As illustratively shown, the laminated insulated timber 800 is similar to the laminated insulated timber 200 of FIG. 2 and its associated embodiments, with at least the exception that the outer side planks 810 comprise externally shaped profiles 806. In the present embodiment, the outer side planks 810 are in a "D" shape (cross-section) to provide the appearance of a cylindrical log to an onlooker. As illustratively shown, the side planks 810 are thicker in width compared with the inner side planks 806. Some embodiments contemplate the radius of the "D" shape to be consistent with half the distance of the height to essentially fall within a circular cross-section. As shown, the "D" shaped outer side planks 810 possess an outer surface 806 that is viewable by an onlooker in the Y direction and the Z direction (e.g., when viewed in the way an onlooker would view a wall composed of multiple timbers 800), which is shaped along the height of the side planks 810 essentially in a consistent, or constant, radius. In certain embodiments, outer surface profiles 806 of the side planks 810 are machined, or formed, to the desired shape prior to laminating the components of the laminated insulated timber 800.

Figure 8B:
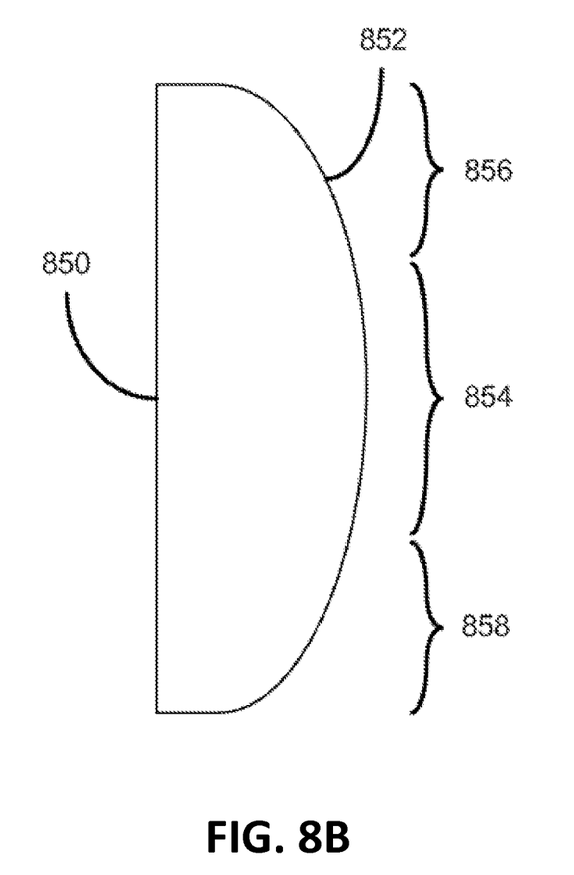
FIG. 8B is a cross-section of an outer D-shaped plank that has a non-constant radius consistent with certain embodiments of the invention.

In optional embodiments, shown in FIG. 8B, the outer surface 852 of an outer side plank 850 is curved along the height in the Z direction of the side plank 850 but not in a consistent radius, i.e., a non-constant radius. As illustratively shown, in this example of a non-constant radius plank 850, the middle of the plank 854 may be flat or only slightly curved, but regions towards the top end 856 and bottom end 858 are more highly curved. Certain embodiments contemplate the top end 856 being more curved (a lower radius of curvature) than the bottom end 858.

In yet other optional embodiments, the side planks 810 are laminated and then shaped to a desired profile by way of a machining/milling operation. Other embodiments contemplate a variety of outer plank shapes, such as a "V" shape or other complex design, which can, in certain embodiments, extend along the length of the side plank 810. Consistent with other embodiments of the present invention, the outer side planks 810 contribute to the tongue 806 and groove 804 arrangements by offsetting the inner planks 812. Other embodiments contemplate only one of the outer planks 810 being in a D-shape while the other outer plank is essentially linear in the Y direction.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the embodiments generally describe a wooden laminated insulated timber, however, the timber could be assembled with fiber-glass planks or press-board planks or other suitable plank materials. Furthermore, though the tongue and groove arrangements are illustratively shown in the figures with an equal number of side planks on either side of a foam member, other embodiments contemplate a different number of side planks to the left of the foam member as opposed to the right of the foam member, for example, without departing from the scope and spirit of the present invention. It is to be further understood that though an adhesive is used to fixedly bond the members (e.g., the planks) of the timber together, some embodiments of the present invention can include alternate means for fixedly laminating the timber together, such as nails, screws, staples, latches, etc. Finally, although the preferred embodiments described herein are directed to timbers for a residential structure (house), it will be appreciated by those skilled in the art that the teachings of the present invention can be applied to other structures that can employ the timbers, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A laminated insulated timber residing in a three-dimensional coordinate system defined by an X direction, a Y direction, and a Z direction wherein said X direction defines a timber width of said laminated insulated timber, said Y direction defines a timber height of said laminated insulated timber and said Z direction defines a timber length of laminated insulated timber, said laminate insulated timber comprising:

a first plank defined by a first plank width extending in said X direction, a first plank height extending in said Y direction, and a first plank length extending in said Z direction, said first plank length is greater than said first plank height, said first plank height is greater than said first plank width;

a second plank defined by a second plank width extending in said X direction, a second plank height extending in said Y direction, and a second plank length extending in said Z direction, said second plank length is greater than said second plank height, said second plank height is greater than said second plank width;

a third plank defined by a third plank width extending in said X direction, a third plank height extending in said Y direction, and a third plank length extending in said Z direction, said third plank length is greater than said third plank height, said third plank height is greater than said third plank width;

a fourth plank defined by a fourth plank width extending in said X direction, a fourth plank height extending in said Y direction, and a fourth plank length extending in said Z direction, said fourth plank length is greater than said fourth plank height, said fourth plank height is greater than said fourth plank width;

a fifth plank defined by a fifth plank width extending in said X direction, a fifth plank height extending in said Y direction, and a fifth plank length extending in said Z direction, said fifth plank length is greater than said fifth plank width, said fifth plank width is greater than said fifth plank height;

a sixth plank defined by a sixth plank width extending in said X direction, a sixth plank height extending in said Y direction, and a sixth plank length extending in said Z direction, said sixth plank length is greater than said sixth plank width, said sixth plank width is greater than said sixth plank height;

an insulation member that is composed of a material that has a greater thermal insulation coefficient than said planks, said insulation member essentially surrounded in said Y direction and said X direction by said second plank, said third plank, said fifth plank and said sixth plank; said fifth plank and said sixth plank are interposed between said second plank and said third plank; said fifth plank and said sixth plank abut against sides of said second plank and said third plank wherein said sides of said second plank and said third plank extend in said Y direction;

said second plank and said third plank extend beyond said fifth plank in a positive direction in said Y direction and said fifth plank extends beyond said first plank and said fourth plank in said positive Y direction both forming tongues;

said sixth plank extends beyond said second plank and said third plank in a negative direction in said Y direction and said first plank and said fourth plank extend beyond said sixth plank in said negative Y direction both forming grooves;

means for fixedly attaching said first plank to said second plank and said second plank to said fifth and said sixth planks and said fifth and said sixth planks to said third plank and said third plank to said fourth plank wherein said widths of said first plank, said second plank, said third plank, and said fourth plank essentially define said tongues and said grooves of said insulated laminated timber.

2. The laminated insulated timber of claim 1 wherein said planks are fixedly laminated together by an adhesive that is cured when said planks are subjected to a mechanical cold-press process.

3. The laminated insulated timber of claim 1 wherein said planks are fixedly laminated together by an adhesive that is cured when said planks are subjected to an electro-mechanical press process.

4. The laminated insulated timber of claim 1 further comprising a seventh plank that essentially bisects said fifth plank and said sixth plank and is parallel to said first plank.

5. The laminated insulated timber of claim 4 wherein said seventh plank extends beyond said fifth plank in said positive Y direction and is recessed relative to said sixth plank in said negative Y direction but said seventh plank is recessed only partially within said sixth plank height.

6. The laminated insulated timber of claim 1 wherein said planks are wooden.

7. The laminated insulated timber of claim 1 adapted to cooperate with a base indexed plate capable of extending in length in said Z direction at least as long as said laminated insulated timber, said base indexed plate possessing protruding features in said positive Y direction to mate with said grooves in said laminated insulated timber, said base indexed plate possessing an integral drip edge extending beyond a ledge where said laminated insulated timber is set on said base indexed plate to a distal edge in said X direction, said integral drip edge possessing a top surface that slopes in said negative Y direction towards said distal edge from said ledge, said base indexed plate possessing a bottom surface that is essentially flat and extends in said X direction and said Z direction; said base indexed plate possessing a recess in said bottom surface located essentially under said integral drip edge.

8. The laminated insulated timber of claim 1 wherein said first plank, said second plank, said third plank and said fourth plank have essentially dimensionally identical heights and widths.

9. The laminated insulated timber of claim 1 wherein at least one of said first plank and said fourth plank is D-shaped with a curved-shaped outer surface.

10. The laminated insulated timber of claim 9 wherein said curved-shaped outer surface comprises a non-constant radius.

11. A laminated insulated timber residing in an X, Y, and Z direction wherein said X direction defines width, said Y direction defines height and said Z direction defines length, said laminate insulated timber comprising:

a plurality of side planks extending in said Z direction fixedly laminated together and offset relative to one another forming a tongue and groove arrangement;

an insulation member interposed between two of said plurality of side planks wherein said insulation member is a different material than said planks;

a top plank and a bottom plank sandwiching said insulation member such that said insulation member is essentially surrounded on four sides by said side planks and said top plank and said bottom plank in said X and said Y directions;

at least a first and second of said side planks extend beyond said top plank in said Y direction and are recessed from said bottom plank in said Y direction; and at least a third and fourth of said side planks are recessed below said top plank in said Y direction and extend beyond said bottom plank in said Y direction.

12. The laminated insulated timber of claim 11 wherein said planks are fixedly laminated together by an adhesive that is cured when said planks are subjected to a mechanical cold-press process or when said planks are subjected to an electro-mechanical press process.

13. The laminated insulated timber of claim 11 further comprising a fifth plank that essentially bisects said top plank to create two top planks and said bottom plank to create two bottom planks, said fifth plank is parallel to said side planks.

14. The laminated insulated timber of claim 13 wherein said fifth plank extends beyond said two top planks forming a center tongue, said two top planks abut said fifth plank, and said fifth plank is recessed from said two bottom planks forming a center groove, said two bottom planks abut said fifth plank.

15. The laminated insulated timber of claim 11 wherein said insulation member is a rigid foam when laminated with said planks.

16. The laminated insulated timber of claim 11 wherein said side planks that are furthest from one another in said X direction are defined as outer side planks that each possess an outer surface viewable by an onlooker in said Y direction and said Z direction, at least one of said side planks is D-shaped wherein said outer surface is shaped along said height of said side plank essentially in a consistent radius.

17. The laminated insulated timber of claim 11 wherein said laminated timber is at least six inches in width and seven inches in height and sixteen feet in length.

18. The laminated insulated timber of claim 11 wherein a second laminated timber is essentially identical to said laminated timber and cooperatively fits into said tongue and groove arrangement.

19. The laminated insulated timber of claim 11 adapted to cooperate with a base indexed plate capable of extending in length in said Z direction at least as long as said laminated insulated timber, said base indexed plate possessing protruding features in said positive Y direction to mate with said grooves in said laminated insulated timber, said base indexed plate possessing an integral drip edge extending beyond where said laminated insulated timber is set on said base indexed plate to a distal edge in said X direction, said integral drip edge possessing a top surface that slopes in said negative Y direction towards said distal edge from where said laminated insulated timber is set, said base indexed plate possessing a bottom surface that is essentially flat and extends in said X direction and said Z direction; said base indexed plate possessing a recess in said bottom surface located essentially under said integral drip edge.

20. The laminated insulated timber of claim 11 wherein said widths and said heights of said planks are unaltered dimensionally after being fixedly laminated together.

21. The laminated insulated timber of claim 11 wherein two of said side planks that are furthest from one another in said X direction form two outer surfaces of said laminated insulated timber, said two side planks that form said two outer surfaces are a different quality material from all others of said planks.

22. The laminated insulated timber of claim 11 wherein said insulation member is formed from expanding foam that becomes rigid upon curing wherein said expanding foam cures after said planks are fixedly laminated together.

* * * * *